(No Model.)  
W. F. BROWNE.  
GENERATING GASEOUS VAPOR.  
No. 263,313. Patented Aug. 29, 1882.
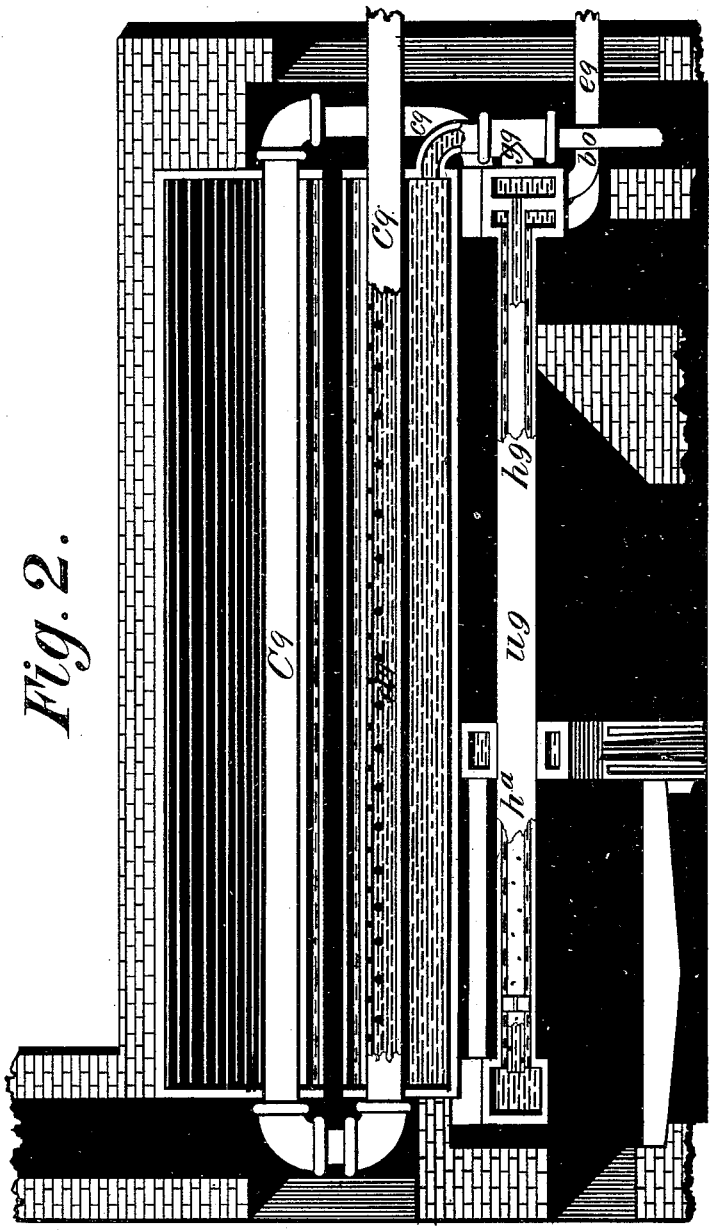
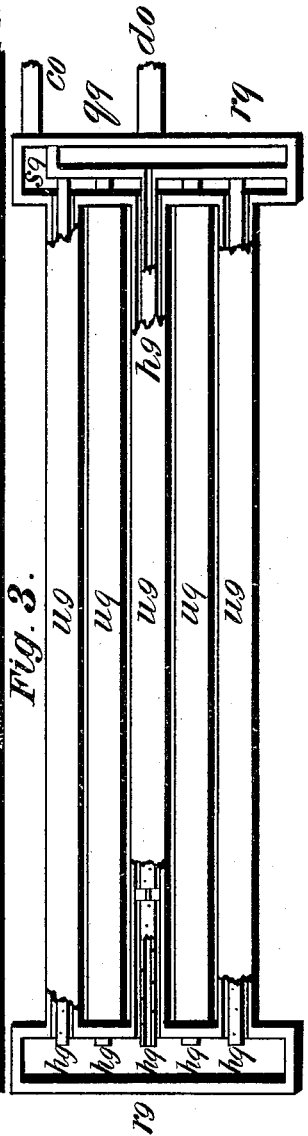
WITNESSES.  
INVENTOR.

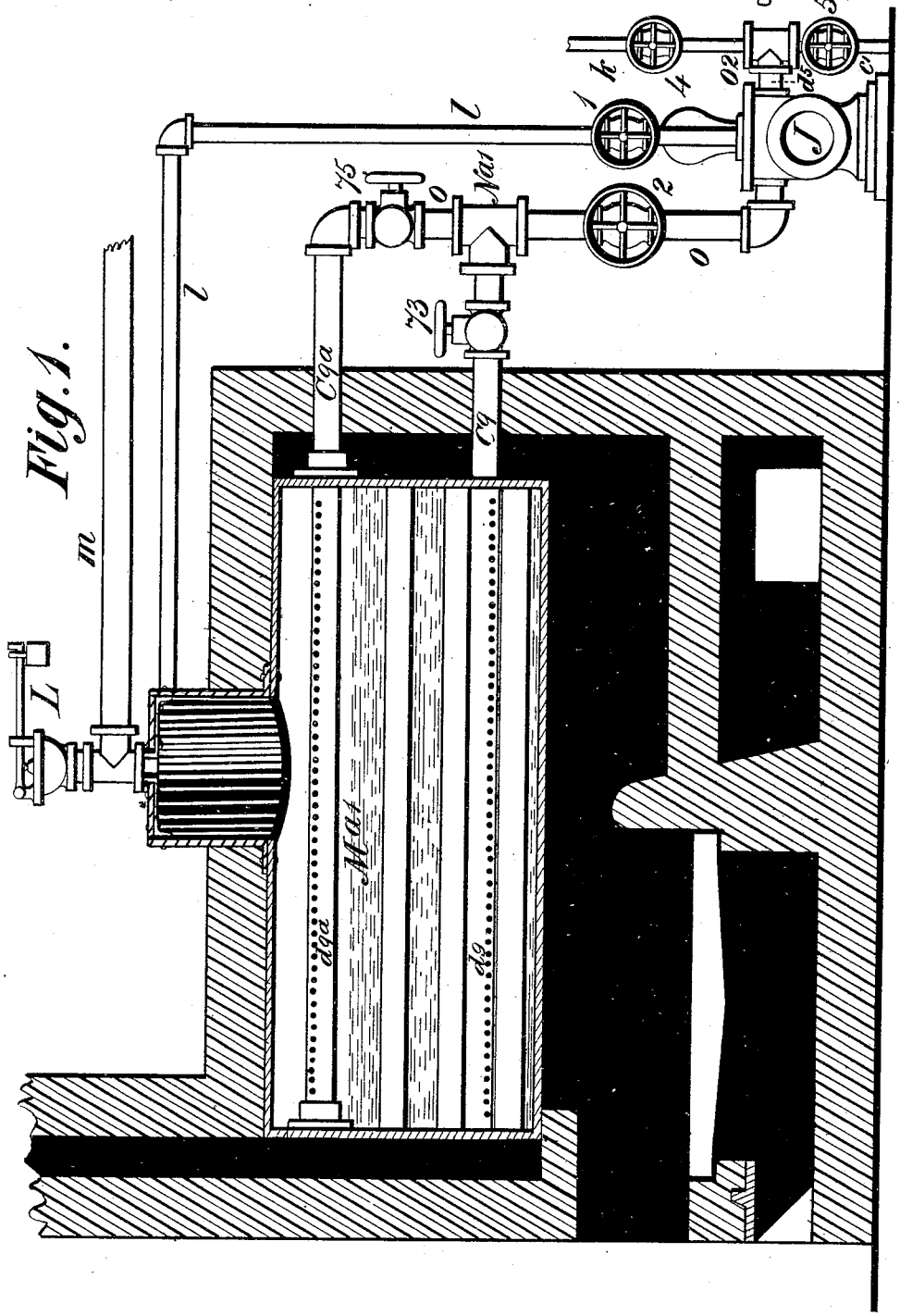

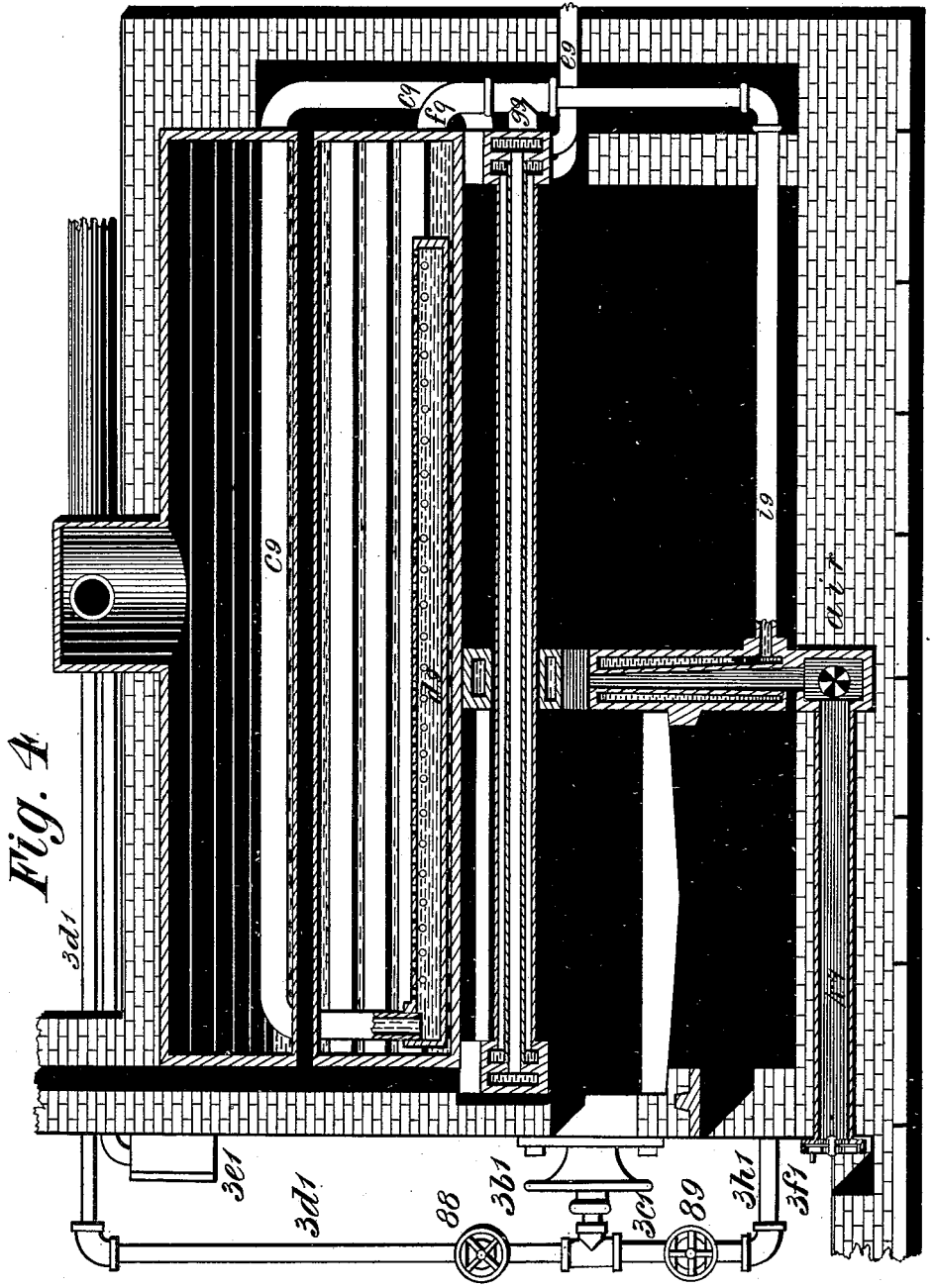

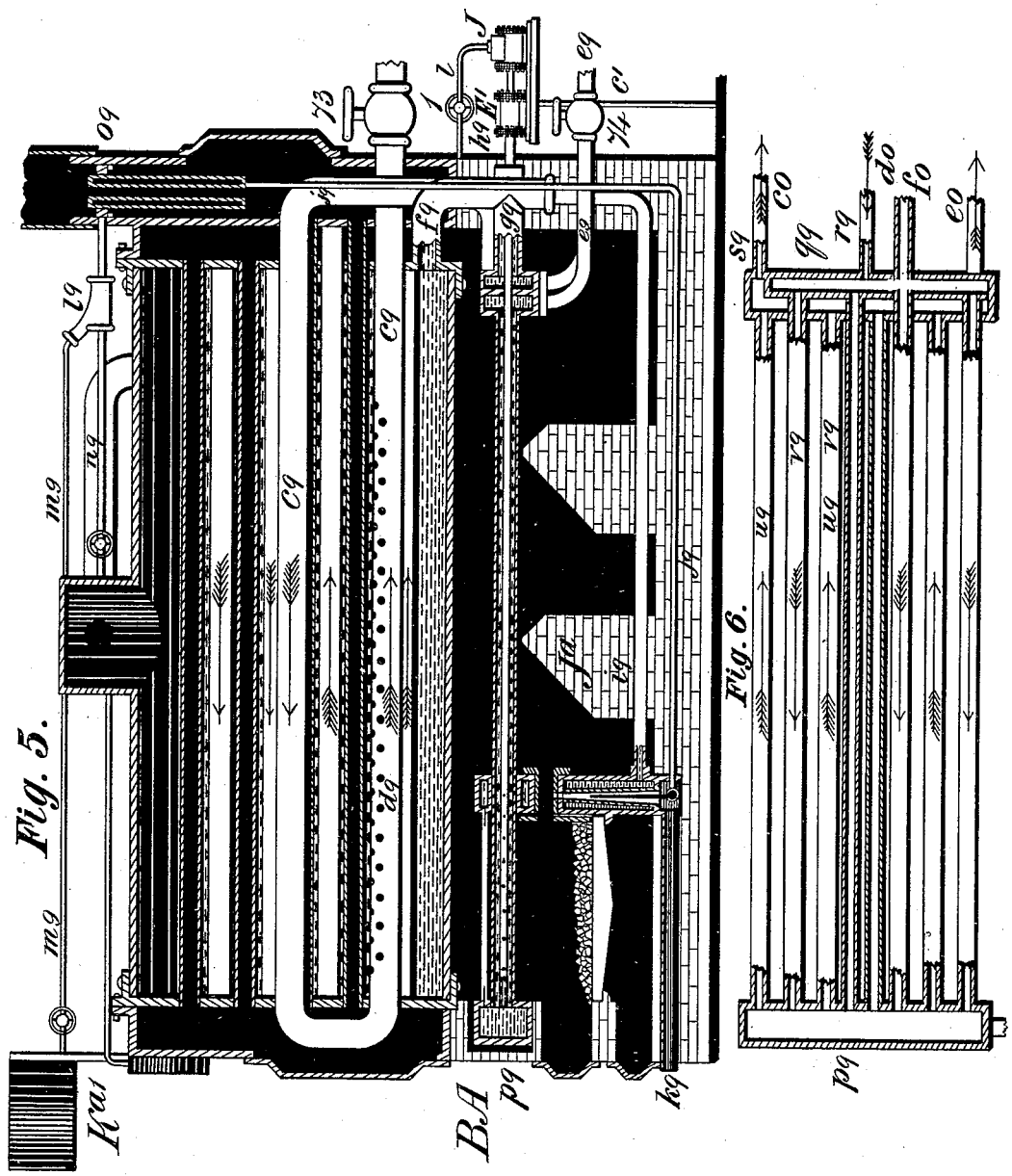

(No Model.) 6 Sheets—Sheet 5.
W. F. BROWNE.
GENERATING GASEOUS VAPOR.
No. 263,313. Patented Aug. 29, 1882.
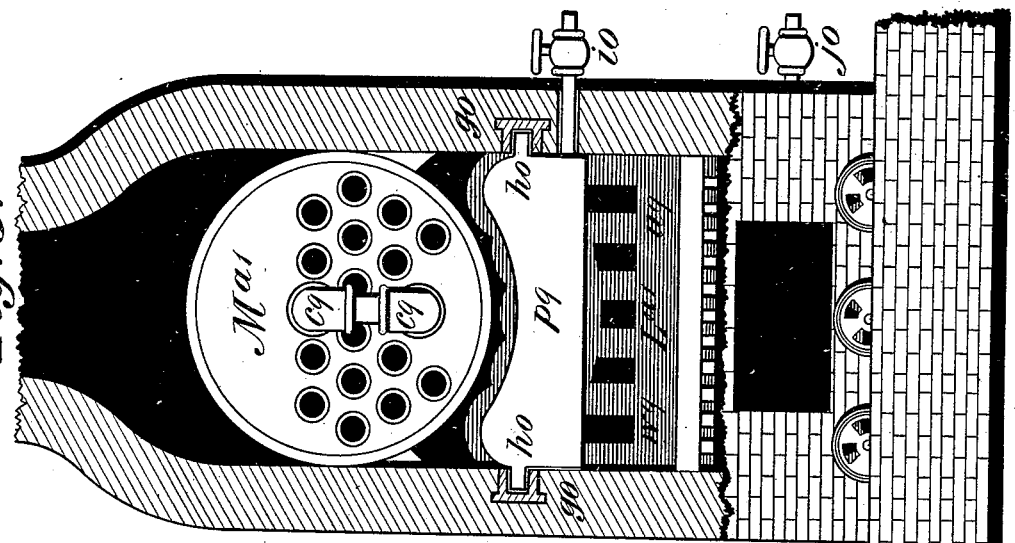
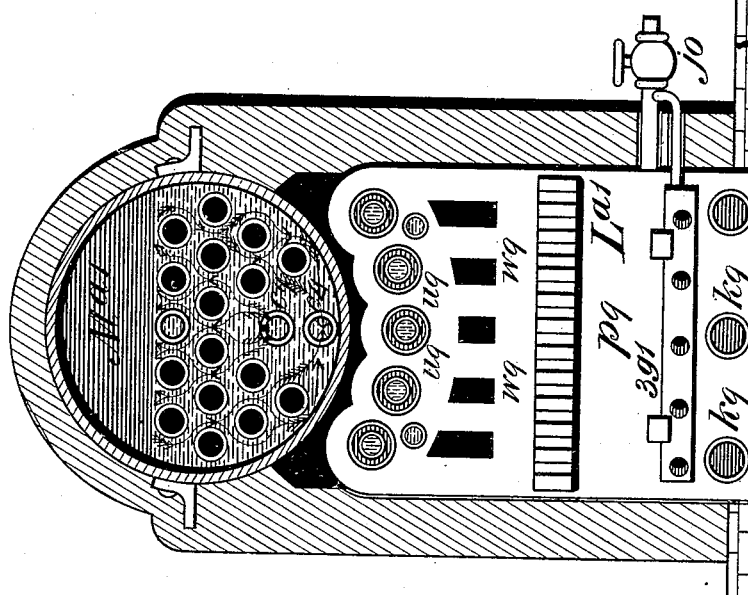
WITNESSES.
R. Sylvani.
E. R. Legrand
INVENTOR
Wm Frank Browne (No Model.)
W. F. BROWNE.
GENERATING GASEOUS VAPOR.
No. 263,313. Patented Aug. 29, 1882.
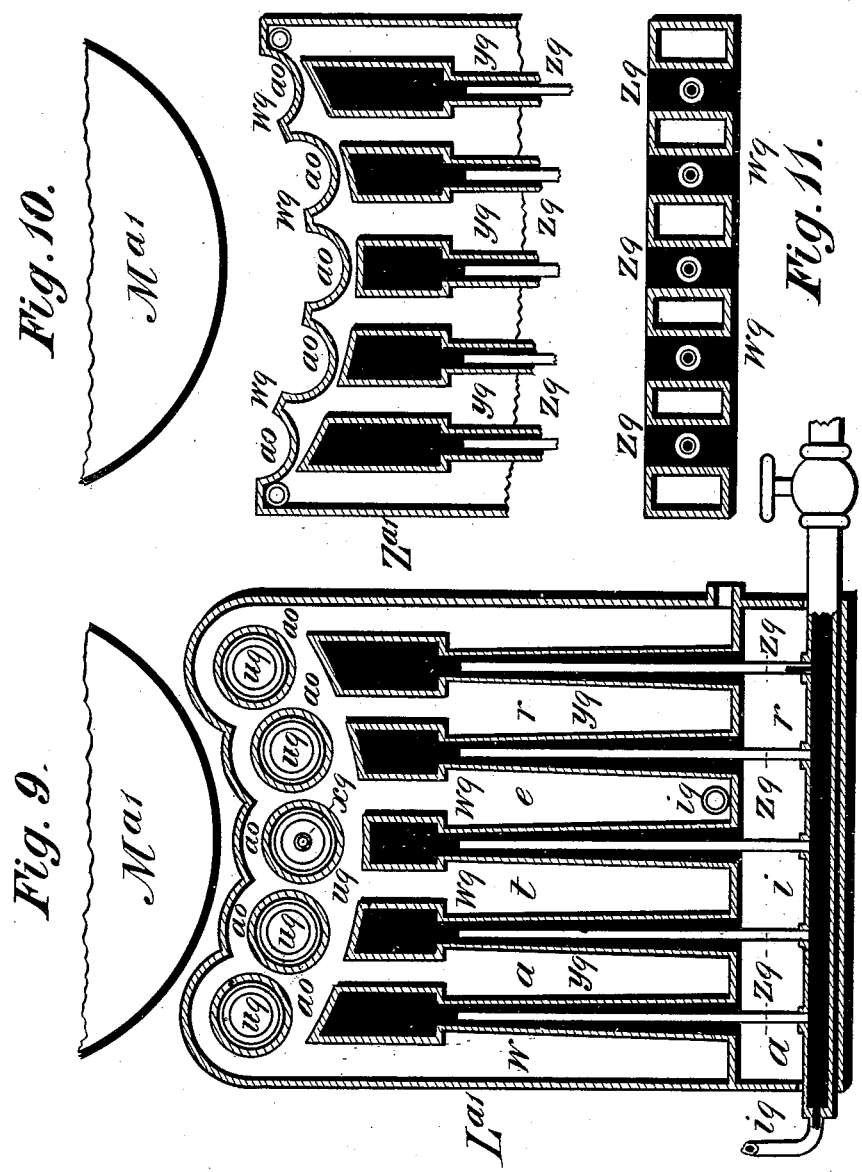
WITNESSES.
INVENTOR.
Wm Frank Browne

UNITED STATES PATENT OFFICE.

WILLIAM FRANK BROWNE, OF NEW YORK, N. Y.

GENERATING GASEOUS VAPORS.

SPECIFICATION forming part of Letters Patent No. 263,313, dated August 29, 1882.

Application filed October 18, 1881. (No model.)

*To all whom it may concern:*

Be it known that I, WM. FRANK BROWNE, of the city, county, and State of New York, have invented a new and useful Process and Improvements for Generating Gaseous Vapors or Gas under High Pressure; and I do declare the following to be a clear and full description thereof, reference being had to the accompanying drawings, which form a part of this specification.

This invention relates to the process of generating gaseous vapors from water and combustible liquids under high pressure for motive power and heating purposes, and also a portion of said gaseous vapors can be forced through suitable heating apparatus, wherein the said gaseous vapors will be converted to a fixed gas, which can be stored in suitable holders for subsequent use for illuminating and heating purposes.

The object of the invention is to utilize all classes of land and marine boilers now in use by generating therein inflammable gaseous vapors or gas, which can be used in lieu of steam for driving engines or motors, the exhaust of which, being conducted into the furnace of the generator, is burned therein, whereby heat is obtained to generate said gaseous vapors or gas.

The invention consists, first, in an apparatus, the process herein described, consisting of means by which a combined mixture of combustible liquid and water is forced into the generating-space of the boiler in such quantities as that the vapors arising therefrom will be sufficiently carbureted, after being used as a motive power, as to be utilized as a combustible, substantially as hereinafter set forth; secondly, in the combination of a furnace, the hollow bridge-wall adapted for heating air and for the reception of heating and water-circulating pipes or chambers, substantially as herein shown and described; thirdly, the method of generating gas or gaseous vapor in a high-pressure generator, and in means for conducting the same to and through a hollow bridge-wall, in which it is additionally heated, and also in means for discharging and distributing the same in an auxiliary rear combustion-chamber, as set forth; fourthly, the combination, with a boiler-furnace, of a series of circulating-pipes with internal pipes therein, the outer pipes being adapted to be connected with suitable headers or head-chambers, which are divided by inner walls, said chambers being also adapted for the ingress and egress of liquids, the structure composed of said pipes and head-chambers being suitably arranged in the furnace for rapidly heating and circulating the liquid passing through, in the manner set forth and described.

Figure 1 is a vertical longitudinal section of a high-pressure gas or gaseous-vapor generator, and view of pump and connecting-pipes for inducting carbureted liquids therein. Fig. 2 is a longitudinal section of a high-pressure gas or gaseous-vapor generator, showing the arrangement of internal circulating, heating, and distributing pipes therein. Fig. 3 is a plan view of a series of circulating-pipes which are located in the fire-box and combustion-chamber of a high-pressure gas or gaseous-vapor generating apparatus. Fig. 4 is a vertical longitudinal section of a high-pressure gas or gaseous-vapor generating apparatus, showing internal circulating-pipes, hollow bridge-wall with openings for the passage of the products of combustion, and flues for the admission of air and gases, and also an arrangement of pipes and nozzles for conducting and discharging gas or gaseous vapor into the combustion-chamber of said high-pressure generator. Fig. 5 is a vertical longitudinal section of a high-pressure gas or gaseous-vapor generating apparatus, showing internal circulating-pipes and external connection therewith, hollow bridge-wall with air and gas connection therewith, deflecting bridge-walls in the combustion-chamber, and an auxiliary apparatus for generating a gas or gaseous vapor in the uptake. Fig. 6 is a plan and sectional view of a series of circulating-pipes and return-chambers or headers attached thereto, which are located in the fire-box and combustion-chamber of the high-pressure gas or gaseous-vapor generating apparatus. Fig. 7 is a vertical transverse section of a high-pressure gas or gaseous-vapor generating apparatus, taken on line $x\ x$, Fig. 2, showing a front elevation of the hollow bridge-wall with flue-passages therein, through which the products of combustion escape, and openings through which circulating-pipes pass, and also pipe connections and openings for the induction of gas or gaseous vapor and air into the flue-spaces leading to the openings in the bridge-wall, (see Fig. 2,) through which the products of combustion escape. Fig. 8 is a vertical elevation and transverse section in line A A, Fig. 2, of a high-pressure gas or gaseous-vapor generator, showing a bridge-wall in the rear of the fire-box and the front header, to which the circulating-pipes shown in preceding figure are attached. Fig. 9 is a vertical section of a hollow bridge-wall, showing the space for circulating and heating combustible liquids, having openings through which the products of combustion escape, and also through which pipes for circulating liquids pass, and also air-passages leading from an air-chamber communicating with said openings. Fig. 10 is a broken sectional view of a modified form of the hollow bridge-wall shown in Fig. 9. Fig. 11 is a transverse section of the hollow bridge-wall shown in Fig. 9.

Referring again to the drawings, Fig. 1 is a vertical longitudinal section of an ordinary tubular boiler, showing a power-pump, J, which forces water and liquid combustibles into the boiler. The water is drawn through supply-pipe $c'$ and controlling-valve 5, while the liquid combustibles are drawn in through pipe $k$ and controlling-valve 4. The two induction-pipes meet in T-fitting $o^2$, the outlet of which is connected to the pump by a close nipple, $d^5$. The eduction of the water and liquid combustibles is through pipe $o$ and controlling-valve 2 into fitting $N^{a'}$, from thence through controlling-valve 73 and pipe $c^9$, from which it is sprayed out through apertures $d^9$ into the water-space in boiler $M^{a'}$, wherein it becomes heated and mingled. The vapors or gases evolved in the boiler with the steam pass off to the motor, and from thence to the furnace, wherein they are burned; or said combined steam and vapor, or a gas, can be conducted to a superheating-conduit, wherein on its passage it will become converted to a fixed gas, which can be stored in a gas-holder for subsequent use; or it can be conducted to furnaces for immediate use. This method for generating a gaseous vapor for subsequent treatment in retorts and gasogenes is an important feature in connection with the manufacture of gas from coal. When the boiler has a sufficient supply of water, but not enough of liquid combustibles, the valve 5 can be closed, thus allowing the liquid combustibles to be forced in alone. If the liquid combustible is highly volatile or easily volatilized, it can be forced into the steam-chamber through pipes $C^{9a}$, instead of pipes $C^9$, and into spray-pipe $d^{9a}$, from whence it will be sprayed out into the surrounding steam or gaseous vapor, where it will readily commingle therewith and be conducted to the pump through pipe $l$, and also through pipe $m$, to whatever place or places desired. Any undue pressure of gaseous vapor in the boiler will escape through the safety-valve L.

A vertical longitudinal section of a steam-generator is shown in Fig. 2, into which water or combined water and liquid combustibles are forced by means of a pump, injector, or any other suitable device. The means for injecting the liquids, either separately or conjointly, can be in connection with either of the pipes $b^o$ $e^9$ $c^9$. When connected with pipe $c^9$ the liquid will be sprayed out into the surrounding water, and as the liquid combustibles are more easily volatilized than the water the volatilization of said liquid combustibles will mingle with the steam in the steam-chamber and form an inflammable gaseous vapor, which can be conducted away through pipes to places of immediate use, either for illumination or for propelling motors, the exhaust gaseous vapors of which can be conducted to the boiler-furnace, where said gaseous vapor will be burned, the heat of which will be utilized to generate gaseous vapor or gas continuously while the motor is running.

When the eduction-pipe for conducting the liquids from the means for injecting the said liquids into the boiler is connected to the pipe $e^9$ or $d^o$ shown in Fig. 3, said liquid will be forced into chamber $q^9$, and from thence through internal pipes, $h^9$. From thence the liquids are discharged into the header or chamber $r^9$, located at or near the front end of the boiler, as shown in Fig. 2. The combined liquids are now forced through the external pipes, $u^9$, back into the chamber $s^9$ in the rear header, $r^9$, from which the combined liquids are forced up through pipe $c^9$ into horizontal pipe $C^9$, from thence through the discharging-orifices $d^9$. The internal pipes, $h^9$, can be provided with holes $h^a$ for the discharge of the liquids into the surrounding pipes.

The pipe $i^9$ (see Fig. 9) connects the boiler with the hollow bridge-wall at or near the bottom thereof, while the top of the said hollow bridge-wall is connected to the front header by a pipe on each side of the furnace. By this means the combined water and liquid combustibles are circulated from the boiler through the circulating-pipes, bridge-wall, and headers $r^9$, from thence through pipe $c^9$ into the boiler.

The hollow bridge-wall $P^9$ or $L^{a'}$ and $Z^{a'}$ shown in Figs. 7, 8, 9, and 10 extend from below the bottom of the ash-pit to near the crown sheet of the boiler $M^{a'}$. (Shown in Figs. 7, 8, 9, and 10.) This bridge-wall is provided with apertures $w^9$, through which the products of combustion and unconsumed gases are drawn. The air passages or flues $y^9$ through the hollow bridge-wall and the pipe $z^9$ therein are for conducting and discharging air and gases into the draft-flues and among the unconsumed gases, where, by the combination, a complete mixture is obtained in the combustion-chamber back of the bridge-wall. The air should be blown into the air space or chamber by a suitable blower, while the gaseous vapor can be supplied from the exhaust of an engine which is run by the high-pressure gaseous vapor; or said gaseous vapor can be drafted directly from the dome through pipe $3^{d\prime}$, controlling valve 88, and tuyere $3^{e\prime}$, from thence into the furnace shown in Fig. 4. The bell-shaped entrance into which the nozzles project is for the purpose of the admission of air by the force of the jet from said tuyere. The exhaust from the engine can be inducted through pipe $3^{f\prime}$, controlling-valve 89, into and through the tuyere, into the furnace below the grate. There should be two tuyeres—one upon each side of the feed-door. More can be used when necessary. Air for natural draft in the bridge-wall can be drawn through the register attached to pipe $k^9$; but when pressure is required to obtain the requisite draft said register can be closed and the air forced into the chamber $a\ i\ r$ by a blower.

In Fig. 5 a device is shown for making gas in a retort, $o^9$, located in the smoke-box and uptake of the gaseous-vapor generator B A. The liquid combustibles are conducted from a tank, $K^{a\prime}$, through the pipe $m^9$ into an injector, $l^9$, and from thence it is discharged by a jet of steam or gaseous vapor, which is conducted from the dome through pipe $n^9$, into and through said injector, into the retort $o^9$, wherein it becomes vaporized or converted to a fixed gas, and thence discharged therefrom through pipe $i^9$ into the pipe $z^9$, Fig. 9, which conducts and discharges the said gas or vapor into the combustion-chamber in the rear of the bridge-wall, where it comes in contact with the deflecting-bridge $J^a$, Fig. 5, which deflects the flaming gases up against and between the circulating-conduits $u^9$ and to the crown-sheet of the generator or boiler $M^{a\prime}$, where the flame is arrested and directed down to and between said circulating-pipes, and thence in and through the upper tubes to the front end of the generator, thence through the lower tubes into and through the uptake.

A sectional plan view of the circulating tubes or pipes is shown in Fig. 6. The power-pump E' and J is connected by pipe $d^o$ with the rear header, $r^9$. This header is provided with two compartments, $s^9$ and $q^9$, one of which is for the admission of liquid, which circulates, as indicated by arrows, through pipe $v^9$, and is discharged therefrom into the front header, $r^9$. From thence the liquids return through pipes $u^9$, and are discharged therefrom into chamber $s^9$, and from thence through pipe $c^o$ into pipe $c^9$, from whence it is discharged through the perforations $d^9$ into the interior of the gaseous-vapor generator. Valve 73, Fig. 5, on pipe $c^9$ is for the purpose of allowing pipe $c^9$ to be blown off when required. Pipes $e^o$ and $f^o$ (shown in Fig. 6) and $e^9$ (shown in Fig. 5) are for blowing off the circulating-pipes and headers.

The water and liquid combustibles are fed by the pump E' J, which derives its motive force through pipe $l$ and controlling-valve 1 from the generator $M^{a\prime}$, (shown in Figs. 1, 7, and 8,) into internal feed-pipe, $x^9$, which may or may not be perforated, from whence the water and liquid combustibles are discharged into the external pipe, $u^9$, (shown in cross-section, Fig. 9,) or into the header $p^9$, (shown in Figs. 5, 6, and 8,) from whence the said liquids are forced back through the external pipes, $u^9$, into the rear header, $r^9$, from whence it is discharged through pipe $c^9$ into the generator $M^{a\prime}$. The air-supply from the hollow bridge-wall is drawn or forced through the conduit $k^9$.

In the cross-section of the generating apparatus, Figs. 7 and 8, the hollow bridge-wall $L^{a\prime}$ is shown with apertures $w^9$, through which a portion of the draft or products of combustion escape, while the remaining portion passes between the crown-sheet and the top of the said hollow bridge-wall. The pipes $u^9$ project through openings in said bridge-wall. The air-holes $k^9$ communicate with the vertical flues shown in Figs. 9 and 10, and, also, the register $3^{g\prime}$ is to regulate or control the admission of air from the chamber $a\ i\ r$ (shown in Fig. 9) into the ash-pit. The valve $j^o$ is to control the admission of air to the bridge-wall, Fig. 7.

The front end of the generator shown in Fig. 8 (saline) is partly removed for the purpose of showing the arrangement of the header $p^9$. To this header all of the pipes $u^9$ are secured, while their other ends thereof are secured to the rear header, $r^9$, in order to provide for the contraction and expansion of the circulating heating-pipes. A grooved support, $g^o$, Fig. 8, is inserted in the side walls of the structure. Into this groove the supporting-lugs $h^o$ enter and slide back and forth in accordance with said expansion and contraction, thereby preventing any undue strain upon the joints. Valve and pipe $i^o$ are for blowing off the header $p^9$.

The hollow bridge-wall is shown in vertical section in Fig. 9, broken vertical section, Fig. 10, and cross-section, Fig. 11. This bridge-wall can be made of cast or wrought iron, with all of the necessary flue and air spaces therein. $W a t e r$ indicates the water-space, and $a\ i\ r$ the flue-space for air. The short cylinders $a^o$, through which the pipes $u^o$ pass, are cast with the bridge-wall, while in Fig. 10 only one-half of the cylinder $a^o$ is formed, thus forming recesses in which the circulating-pipes rest.

The herein-described invention can be applied to all classes of shell, tubular, or pipe boilers, or to all devices in which steam may or can be generated for motive power or heating purposes, whether on land or water. Locomotive-boilers can be used to generate the gaseous vapor or gas, which can be employed for motive power to drive said locomotive, while the exhaust gaseous vapor or gas from the locomotive engines or motors can be conducted to the furnace thereof and burned therein, where, by the heat generated from said combustion, high-pressure gaseous vapor or gas is generated in quantity sufficient to supply the cylinder or motor of the locomotive and the combustion in the furnace thereof.

Marine boilers can be utilized to generate high-pressure gaseous vapor in a similar manner, and the high-pressure gaseous vapor or gas utilized to drive the marine engine with, while the exhaust gaseous vapor or gas therefrom can be conducted to the boiler-furnace and be burned to generate high-pressure gaseous vapor or gas in sufficient quantity to supply the engine and furnace without requiring any other fuel or means for motive power and fuel for generating said motive power. By this means high-pressure engines can be used on shipboard in lieu of the low-pressure or condensing engines now in use. The amount of heat saved by discharging the exhaust into the furnace will be greater than when saved by condensation prior to its return to the boiler; and, furthermore, the effects derived from the combustion of the exhaust gaseous vapor or gas will more than equalize the force exerted upon the piston by means of the vacuum.

What I claim, and desire to secure by Letters Patent, is—

1. The process of generating high-pressure gas or gaseous vapor for motive power, heating, and other purposes, consisting of forcing water and liquid combustibles under pressure into a steam-boiler, and there discharging them in mingled jets or spray, and then conducting the resulting vapor into a receiver or to an engine for use as a motive power.

2. The combination, in an apparatus for generating high-pressure gaseous vapor, of the force-pump, the induction coil and water pipes, and the eduction-pipe, whereby a combined volume of mixed liquid is simultaneously forced in the generator, substantially as described.

3. A hollow bridge-wall provided with water-circulating spaces and intermediate spaces for the passage of air and products of combustion, in combination with gas-supply pipes arranged within said air-flues, for the purposes specified.

4. The hollow bridge-wall having water and air spaces, substantially as described in combination with the circulating-tubes and their return connecting head-chambers and a generator, as set forth.

5. In a high-pressure gaseous-vapor generator, a series of external pipes and a series of internal pipes, each connected to suitable return head-chambers for the circulation of liquids, in combination with the furnace and boiler, for the purpose specified.

6. The circulating-tubes and their connected return-chambers provided with supporting-lugs $h^o$, in combination with the furnace-walls having recesses for receiving the lugs and permitting a free movement thereof under expansion and contraction, substantially as described.

WM. FRANK BROWNE.

Witnesses:
WM. APGAR,
JAS. H. MATTHAEI.